INVENTOR:
MOSES SHACHTER
BY
Breitenfeld & Levine
ATTORNEYS

INVENTOR:
MOSES SHACHTER
BY
Breitenfeld & Levine
ATTORNEYS

FIG. 9

INVENTOR:
MOSES SHACHTER
BY
Breitenfeld & Levine
ATTORNEYS

INVENTOR:
MOSES SHACHTER
BY
ATTORNEYS

FIG. 13

INVENTOR:
MOSES SHACHTER

INVENTOR:
MOSES SHACHTER
BY
Bratenfeld & Lamie
ATTORNEYS

United States Patent Office 3,375,661
Patented Apr. 2, 1968

3,375,661
INFINITELY VARIABLE HYDRAULIC
TRANSMISSION MECHANISM
Moses Shachter, Detroit, Mich.
(23034 Kipling St., Oak Park, Mich. 48237)
Filed Aug. 31, 1966, Ser. No. 576,386
10 Claims. (Cl. 60—53)

This invention relates to hydraulic mechanisms of the kind in which a torque is transmitted from a rotary hydraulic pump to a rotary hydraulic motor, at least one of the said hydraulic units being of relatively variable receiving and discharging capacity for the purpose of varying the relative speeds of the units.

It is an object of the invention to provide a hydraulic transmission mechanism in which the relation between the input and output speeds and torques can be varied infinitely.

A further object of this invention is to provide a mechanism of this kind in which the output shaft rotation can be reversed steplessly without reversing the input shaft rotation.

Another object of the invention is to provide a kinetic energy accumulator, comprising a hydraulic mechanism of the type referred to, capable of decelerating a rotating element such as the wheel of a moving vehicle, accumulating part of the kinetic energy of the rotating element, and thereafter accelerating it by retransferring to the element the energy previously accumulated.

In furtherance of these objects, the invention comprises two hydraulic units which cooperate with a common rotatable casing, the hydraulic units and casing being within a suitable housing. A hydraulic circuit is arranged in the casing between the hydraulic units, to conduct fluid from one unit to the other. At least one of the hydraulic units is constructed to have a variable fluid receiving and discharge capacity. Means are provided for varying the amount of fluid displaced by the variable capacity hydraulic unit, whereby the relation between the input and output speeds and torques is correspondingly varied.

Each of the hydraulic units comprises a principal gear having a group of planet gears engaging its periphery. The principal gear, which may be in the form of either a sun gear or a ring gear, is rotatable with respect to the housing in one of the units, but is non-rotatable in the other unit. However, the non-rotatable gear is slidable within the housing so that the width of engagement between its gear teeth and those of the planet gears with which it cooperates may be varied. This variation in the gear engagement width constitutes the means by which the variation in the fluid handling capacity of the variable unit is achieved.

Another feature of the invention is the employment of a variable hydraulic transmission, substantially of the type described above, in connection with a rotating element, such as the road-engaging wheel of a vehicle. The variation of the transmission capacity is effected in conjunction with the braking of the vehicle, so that when the vehicle wheel is decelerated, the speed of the housing, which in this case is rotatable, is increased. Conversely, when the braking action is removed from the wheel, the speed of the housing is decreased. This operation of the rotatable housing provides what is referred to as a kinetic energy accumulator, which aids in both the deceleration and subsequent acceleration of the vehicle, by absorbing kinetic energy from the wheel when the wheel is being decelerated, and by retransferring the accumulated kinetic energy to the wheel when the braking force is removed.

These and other objects and features of the invention will be apparent in the specific embodiments of the invention which are illustrated in the accompanying drawings and described in the following detailed specification.

The first embodiment of the invention, as depicted in FIGS. 1-8, is compactly arranged within a rigid, cylindrical housing 10, provided at one end with a stationary end plate 12 and at the other end with a rotatable end plate 14. The end plate 12 is secured to housing 10 by suitable means such as nuts 15 secured to bolts 19 which extend through a rectangular flange 17 (FIG. 2) extending from housing 10, and a corresponding flange (not shown) extending from cover plate 12. A central passageway is provided in cover plate 12 for accommodating an input shaft 16. A corresponding central passageway is provided in cover plate 14 for receiving an output shaft 18. Each of the shafts 16 and 18 is provided with an appropriately formed key 20 which is adapted to engage suitable driving and output apparatus with which the transmission of the invention may be utilized. A conventional ball bearing 22 is housed within a central bore formed in the interior of cover plate 12 and surrounds a cylindrical section 24 of input shaft 16, to permit rotation of input shaft 16 with respect to housing 10.

Within an outer central bore 26 formed in cover plate 12, a sealing ring 28 is disposed to snugly fit around input shaft 16. Snap ring 30, also secured within bore 26, retains sealing ring 28 within bore 26. A similar construction is provided at the output side of the apparatus, where a ball bearing 32 is disposed within a bore formed in cover plate 14 and a sealing ring 34 is retained by a snap ring 36 within a bore 38 formed in cover plate 14. The seals 28 and 34 keep the interior of the housing 10 relatively dirt free.

A casing 40, integral with the input shaft 16, is located within housing 10, and rotates along with input shaft 16. A central bore 42 (FIGS. 1 and 3), formed within casing 40, houses ball bearings 44 and 46 which accommodate the inner portion of output shaft 18, to permit relative rotation between output shaft 18 and casing 40.

A sun gear 48, shown integrally formed on output shaft 18, is rotatable with shaft 18. The sun gear could, of course, be a separate element fixed to and rotatable with the shaft 18. The outer toothed periphery of sun gear 48 is engaged by a series of equidistantly spaced, identically formed, planet gears 50. Each planet gear 50 is rotatably mounted on a bolt 52 which extends through equidistantly spaced longitudinal openings 54 provided in casing 40. Each opening 54 is centrally formed within one of a group of cutouts 56 formed in the output side face of casing 40. A fixed displacement hydraulic unit 58 (FIG. 5) is formed by the sun gear 48 and the set of planet gears 50 engaging the teeth formed along its other periphery.

In the opposite face of casing 40, a second group of equally spaced cutouts 56′ is provided. Cutouts 56′ are offset from cutouts 56 so that a cutout section 56′ is arranged between each adjacent pair of cutouts 56. Each cutout 56′ is similarly provided with an opening 54′ through which bolts 52′ pass. A second set of planet gears 66 is rotatably mounted on bolts 52′. The ends of the teeth of planet gears 50 and 66 must be sufficiently close to the walls of cutouts 56 and 56′, respectively, to prevent hydraulic fluid from flowing between the ends of the teeth and the cutout walls. Sufficient spacing must, however, be provided to permit the planet gears 50 and 66 to rotate about their axes without interference from the cutout walls. Thus, it will be seen that the casing 40, which is itself rotatable, rotatably carries in one face a series of planet gears 50, and rotatably carries in its other face a series of planet gears 66, the gears of each series being offset from the gears of the other.

Cover plates 55 and 57 are secured to the opposite faces of casing 40, and are secured in place by means of nuts 59 secured to the ends of bolts 52 and 52′. To insure a fluid-tight arrangement at the output side of casing 40, a snap ring 61, disposed within an annular groove 65 in plate 57, retains a sealing ring 63 between the output shaft 18 and plate 57. The fluid-tight seal at the input side of the casing will be described below.

Figure 1:
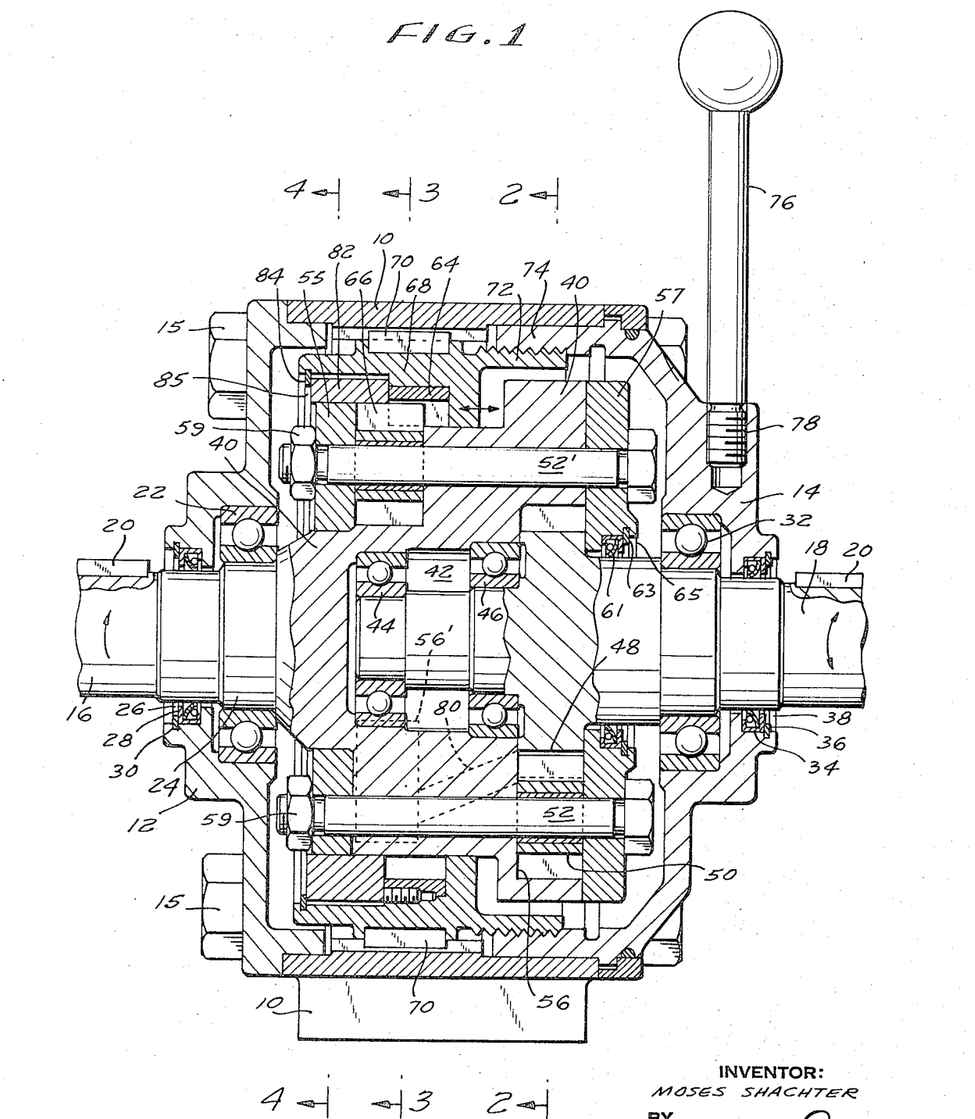
FIG. 1 is a vertical cross-section of one embodiment of a hydraulic transmission system according to this invention.
Figure 2:
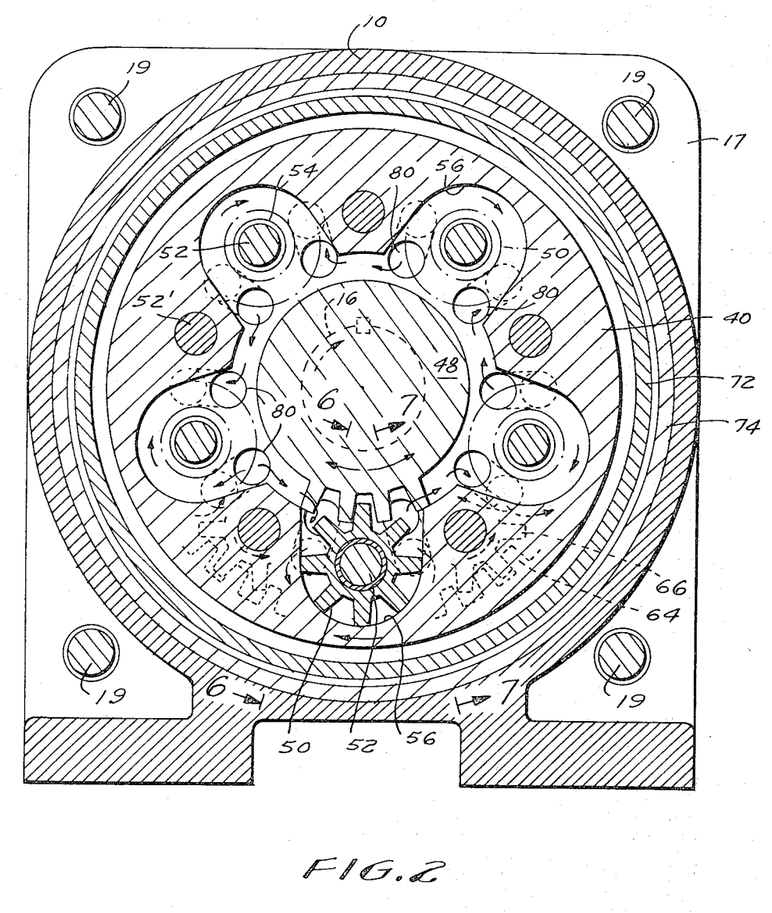
FIG. 2 is a sectional view taken along line 2—2 of FIG. 1.
Figure 3:
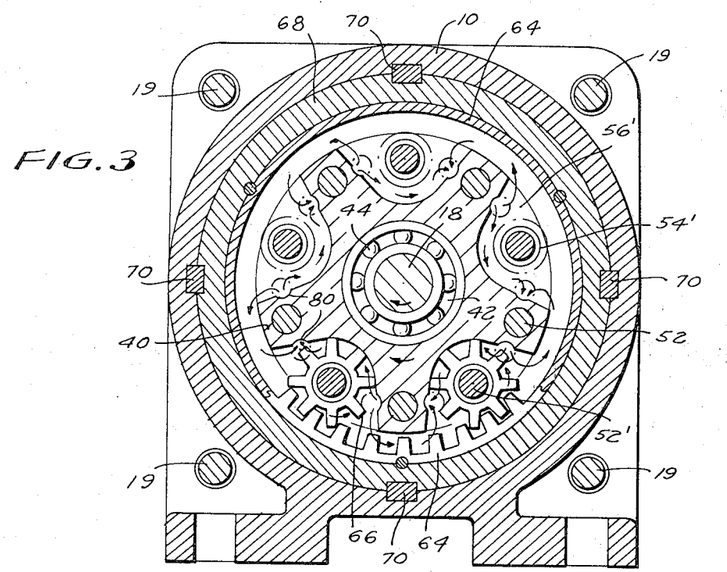
FIG. 3 is a sectional view taken along line 3—3 of FIG. 1.
Figure 4:
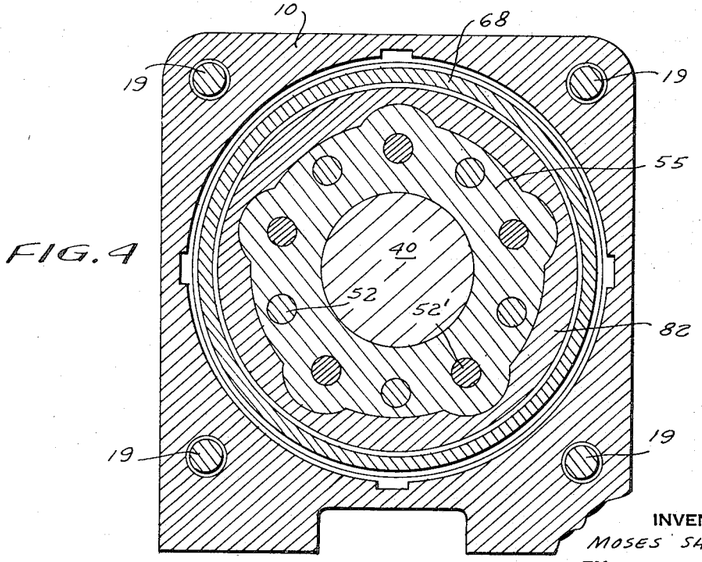
FIG. 4 is a sectional view taken along line 4—4 of FIG. 1.
Figure 5:
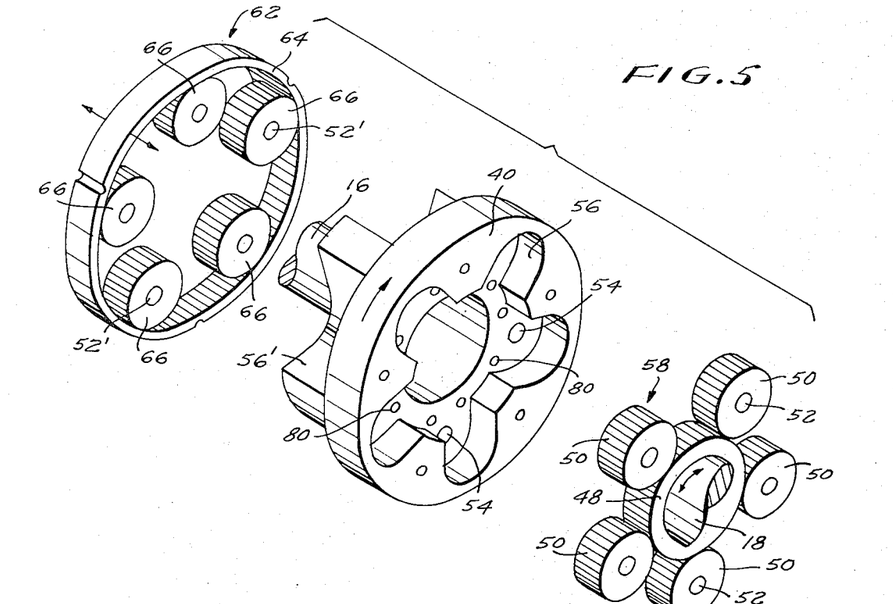
FIG. 5 is an exploded perspective view, illustrating schematically the two hydraulic units and the rotatable casing.

A variable capacity hydraulic unit 62 (FIG. 5) is formed of a ring gear 64, non-rotatable with respect to housing 10, and the set of planet gears 66 which engage the inner periphery of ring gear 64. Ring gear 64, which is disposed coaxially with the axis of rotation of casing 40, is press fitted into an outer ring 68 (FIGS. 1, 3, and 4). Outer ring 68 is provided with four equally spaced keys 70, each of which engages a corresponding slot formed longitudinally along the inner surface of housing 10. In this manner, outer ring 68 as well as ring gear 64 is prevented from rotating with respect to housing 10, while maintaining freedom to slide longitudinally along the inner surface of housing 10. Outer ring 68 is also provided with a threaded section 72 of reduced diameter, which engages a cooperatively threaded extension 74 of rotatable end plate 14. A handle 76 is threadably secured into a threaded bore 78 provided in end plate 14. As a result, when handle 76 is pivoted away from the vertical position, shown in FIG. 1, rotatable plate 14 will rotate thereby causing outer ring 68 to slide axially either to the left or right in accordance with the direction of movement of handle 76.

Ring gear 64, being in secure engagement with outer ring 68, axially moves along with outer ring 68. As a result of ring gear 64 being axially displaced, in the manner described, the width of meshing engagement between the teeth of ring gear 64 and the teeth of the planetary gears 66 will be varied, thus varying the fluid receiving and discharging capacity of the hydraulic unit 62.

Figure 6:
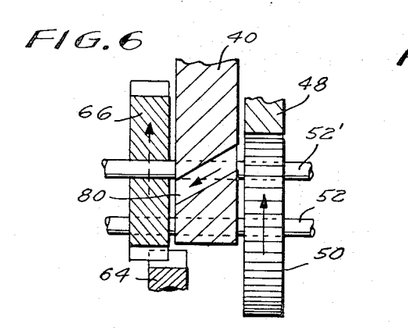
FIG. 6 is a fragmentary sectional view along the line 6—6 of FIG. 2.
Figure 7:
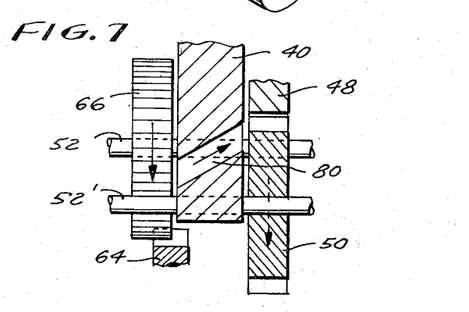
FIG. 7 is a fragmentary sectional view along the line 7—7 of FIG. 2.

The fixed displacement unit 58 is operatively connected to the variable displacement hydraulic unit 62 by means of a hydraulic circuit between the two units. A series of conduits 80 is provided within the central section of casing 40, and a hydraulic fluid, such as oil, is caused to flow through conduits 80 between the two units. As seen in FIGS. 6 and 7, conduits 80 incline in both the vertical and horizontal planes so that the inlet and outlet of each port of each conduit 80 lies adjacent to the teeth of planet gears 50 and 66. The two hydraulic units 58 and 62 and the connecting conduits 80 form a single closed hydraulic circuit.

A rotatable sealing ring 82 is disposed about the outer periphery of cover plate 55. Ring 82 contacts a section of outer ring 68 and ring gear 64, and is arranged to axially slide along with ring 68, while maintaining a fluid seal with plate 55. A snap ring 84, disposed within an annular channel 85, urges ring 82 into intimate contact with outer ring 68. This construction provides a substantially fluid-tight seal for the variable displacement unit 62. It should be noted that, as shown best in FIG. 4, the arcuate configuration of the inner periphery of ring 82 is accurately formed to accommodate the outer periphery of plate 55. The arcuate outer periphery of plate 55 follows the path of the tops of the teeth of the ring gear 64 where they do not engage the teeth of planet gears 66, and then follows the path formed by the tops of the teeth of planet gears 66 where they engage the teeth of ring gear 64.

The rotation of the input shaft 16 causes the casing 40 to rotate along with it. Planet gears 50 and 66 revolve, along with casing 40, around the axis of casing 40. As a result of the meshing of planet gears 50 and 66 with sun gear 48 and ring gear 64, respectively, the planet gears of each series are caused to rotate in opposite directions. Planet gears 50 rotate in the same direction as input shaft 16, and planet gears 66 rotate in the opposite direction.

The rotation of the planet gears 50 and 66 acting upon the hydraulic fluid within the cutouts 56 and 56′ in casing 40 causes the fluid to flow to and fro through the conduits between the two units. The amount of fluid which can be displaced and transmitted by variable unit 62 is proportional to the width of engagement between ring gear 64 and planet gears 66. As described below, at certain values of this engagement width, the output shaft 18 will be caused to rotate.

Before describing the operation resulting in the transmission of rotary motion to the output shaft, a brief theoretical analysis of the relation between the input and output shaft speeds will now be presented. The theoretical fluid handling capacity of the variable displacement unit 62 is:

$$Q_1 = \omega_i \frac{W_1 N_1 S}{P^2} \qquad (1)$$

and the theoretical fluid handling capacity of the fixed hydraulic unit 58 is:

$$Q_2 = (\omega_i - \omega_o) \frac{W_2 N_2 S}{P^2} \qquad (2)$$

where:

$Q_1$ = fluid handling capacity of the variable displacement unit 62;
$Q_2$ = fluid handling capacity of the fixed displacement unit 58;
$\omega_i$ = angular rotational speed of the input shaft 16;
$\omega_o$ = angular rotational speed of the output shaft 18;
$W_1$ = variable width of engaged portion of ring gear 64;
$W_2$ = width of engagement of sun gear 48;
$N_1$ = number of teeth in ring gear 64;
$N_2$ = number of teeth in sun gear 48;
$S$ = number of planet gears 50 or 66 in each displacement unit; and
$P$ = diametral pitch of the planet, ring, and sun gears.

For the case of a closed or balanced fluid circulation, as provided herein, the fluid transmitted by each of the hydraulic displacement units must be equal, so that $$Q_1 = Q_2 \qquad (3)$$

Combining expressions (1), (2), and (3), the following relationship between the input and output shaft speeds is obtained:

$$\omega_o = \omega_i \left(1 - \frac{W_1 N_1}{W_2 N_2}\right) \quad (4)$$

In a more precise determination of this relationship, the factor of volumetric efficiency should be included, but expression (4) is essentially accurate for all practical conditions.

It will be seen that by varying the factor $W_1$, i.e., the width of engagement between the teeth of ring gear 64 and planet gears 66, the speed of rotation of output shaft 18 is proportionately varied. Also, when the expression $W_1 N_1 / W_2 N_2$ is greater than unity, the direction of rotation of output shaft 18 will be opposite to the direction of rotation of input shaft 16. Furthermore, when $W_1 N_1 / W_2 N_2$ is equal to unity, the output shaft 18 will be at rest irrespective of the speed of rotation of input shaft 16. This latter condition is designated as the neutral position and can advantageously be made to occur when handle 76 is in the vertical position shown in FIG. 1.

When handle 76 is rotated in one direction away from its vertical position, the threaded engagement between rotatable casing 14 and outer ring 68 causes ring 68 to axially move to the left in FIG. 1. Ring gear 64 snugly fitted into outer ring 68, moves along with it. Since planet gears 66 are fixed in their axial positions on bolts 52', the axial movement of ring gear 64 will vary the width of engagement between the teeth of ring gear 64 and the teeth of planet gears 66. Rotating handle 76 in the opposite direction will cause ring 68 to move to the right causing the width of engagement between ring gear 64 and each planet gear 66 to decrease.

The former case will now be discussed. It should first be understood that when the handle 76 is in its neutral position the output shaft 18 and sun gear 48 are at rest, but the casing 40 is rotating along with input shaft 16 causing planet gears 50 to rotate about their respective bolts 52. However, since planet gears 50 are also revolving along with casing 40, their axial rotation does not produce rotation in sun gear 48, and therefore output shaft 18 does not rotate.

Figure 8:
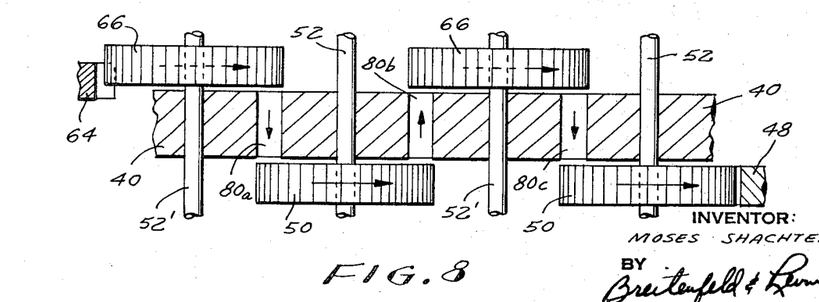
FIG. 8 is a developed schematic representation of the elements shown in FIGS. 6 and 7, illustrating the fluid circuit between the two hydraulic units.
Figure 9:
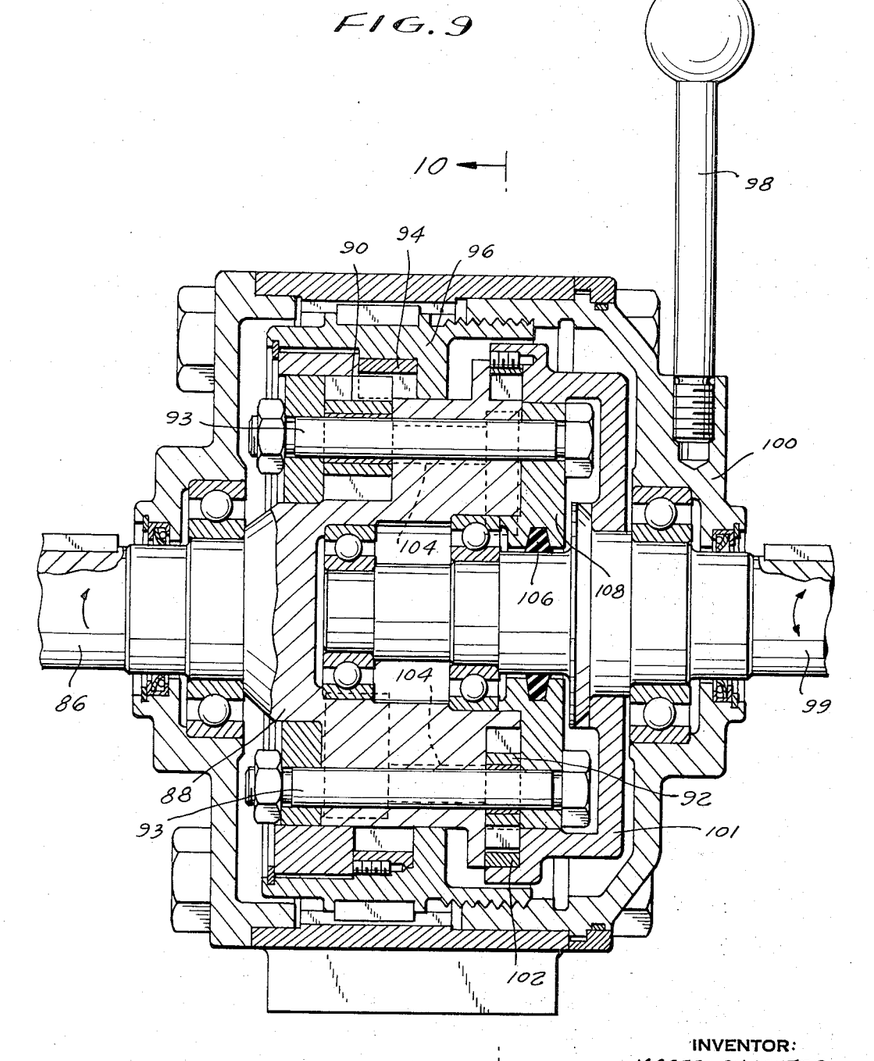
FIG. 9 is a vertical cross-sectional view of a second embodiment of this invention.
Figure 10:
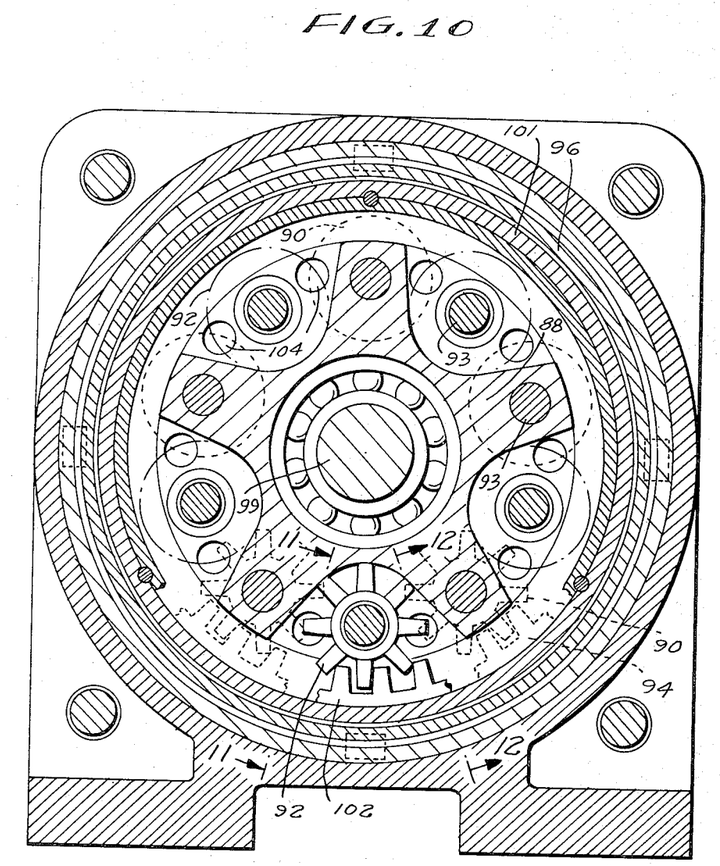
FIG. 10 is a sectional view taken along line 10—10 of FIG. 9.
Figure 11:
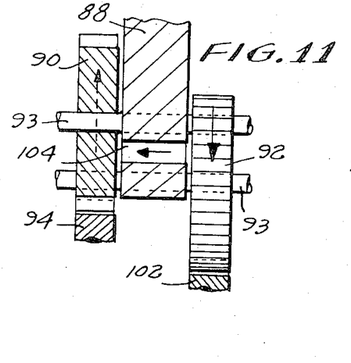
FIG. 11 is a fragmentary section taken along line 11—11 of FIG. 10.
Figure 12:
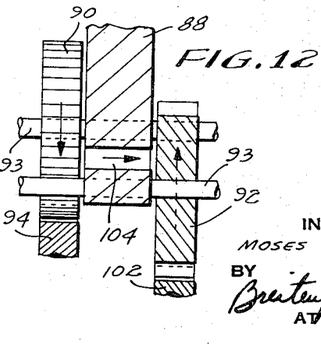
FIG. 12 is a fragmentary section taken along line 12—12 of FIG. 10.

When the width of engagement $W_1$ is increased, the amount of hydraulic fluid that is transmitted by variable displacement unit 62 is also increased. Referring to FIG. 8, wherein the direction of fluid circulation and rotation of the gears is illustrated by the arrows, and conduits 80a and 80b designate any pair of adjacent conduits 80, it is seen that an increase in the amount of fluid through conduit 80a requires an increase reverse flow of fluid through conduit 80b to maintain balance in the hydraulic circuit. Since the fluid displacement capacity of unit 58 is fixed, the fluid balance must be maintained by increasing the rotational speed of the planet gears 50 about their shafts 52. Since the speed of revolution of planet gears 50 remains fixed at the speed of rotation of the input shaft 16, this increase in rotational speed of planet gears 50 is obtained by causing sun gear 48 to rotate in a direction opposite to the direction of rotation of each of the planet gears 50. A further increase in the width of engagement $W_1$ will cause a further increase in the flow of hydraulic fluid from hydraulic unit 62 to thereby produce a corresponding increase in the speed of rotation of sun gear 48 and hence output shaft 18.

Conversely, when handle 76 is positioned to decrease the width of engagement $W_1$, the amount of fluid displaced by hydraulic unit 62 will decrease, causing a lesser amount of fluid to flow through part 80a. As a result of this change in amount of fluid flow, the relative speed of rotation of each planet gear 50 will decrease, causing sun gear 48 now to rotate in the same direction as planet gears 50 and input shaft 16.

It can thus be seen that by merely causing the ring gear to axially slide, a continuous stepless variation in the speed of the output shaft from zero to maximum speed may be effected at a constant speed of the input shaft. Furthermore a reversal of direction of the output shaft may also be effected without changing the input shaft rotation, and the speed of the output shaft 18 in the reverse direction may be varied steplessly.

It will be appreciated that means (not shown) may be provided to replace fluid escaping from the closed hydraulic circuit, and for keeping this circuit under proper pressure. These arrangements are well-known in conventional hydraulic transmission systems, and since they do not form an essential part of this invention, they will not be further described.

A second embodiment of this invention is illustrated in FIGS. 9–12. The input side of the unit is substantially the same as that described above, and comprises an input shaft 86 having an integral rotating casing 88 which carries in its opposite faces, groups of planet gears 90 and 92. Planet gears 90 and 92 are rotatably mounted on bolts 93 which extend through casing 88. Rotation of input shaft 86 causes casing 88 to rotate, which produces a rotation of planet gears 90 and 92 around their axes.

As in the previously described embodiment, a variable hydraulic input unit is formed by planet gears 90 and a non-rotatable ring gear 94. Ring gear 94 is axially slidable along with an outer ring 96 which is axially moved when handle 98 is rotated, via a rotatable end plate 100.

End plate 100 and outer ring 96 are threadably engaged so that the rotation of handle 98, in either direction away from the vertical, will cause ring gear 94 to move in the axial direction. It will therefore be appreciated that ring gear 94 and the set of planet gears 90 provide a variable displacement hydraulic unit substantially equivalent to unit 62 previously described.

The output, or fixed displacement, unit which is operatively connected to an output shaft 99 differs from that of the previously described embodiment. A wheel 101 is secured to output shaft 99, by means such as welding, and a ring gear 102 is press fitted into wheel 101. Ring gear 102 and planet gears 92 form a fixed displacement unit corresponding in function to the fixed displacement unit 58 of the embodiment of FIGS. 1–8.

A series of conduits 104 extend through casing 88 to provide a fluid flow path between the two hydraulic units. An elastomer ring 106 is securely fitted around the periphery of the output shaft 99 and is fitted into an annular groove provided in cover plate 108 to prevent the leakage of hydraulic fluid out of the casing.

The theory of operation of this embodiment is substantially the same as that of the first embodiment. Formula 4 is still applicable with the understanding that the symbols $W_2$ and $N_2$ represent, respectively, the width and number of teeth of ring gear 102. Ring gears 94 and 102 are of substantially equal diameter and comprise, in this design, the same number of teeth. The only significant difference between the ring gears 92 and 102 is the difference in the widths of their teeth. Therefore, since $N_1 = N_2$, Equation 4 can be simplified to appear as follows:

$$\omega_o = \omega_i \left(\frac{W_2 - W_1}{W_2}\right) \quad (5)$$

wherein $W_1$ is the variable width of engagement between the teeth of ring gear 94 and planet gears 90.

The rotation of input shaft 86 causes casing 88 to rotate along with it. Planet gears 90 and 92 revolve, along with casing 88, and due to their engagement with ring gears 94 and 102, respectively, the planet gears are caused to rotate about their axes, i.e., around bolts 93. As shown by the arrows in FIGS. 11 and 12, the planet gears 90 and 92 rotate in the same direction. As before, by moving handle 98 away from the vertical, the width of engagement between ring gear 94 and planet gears 90 ($W_1$ in Equation 5) is varied, producing a variation in the amount of hydraulic fluid transmitted through conduits 104 to the teeth of planet gears 92 in the direction of the arrows in FIGS. 11 and 12. As explained in the discussion of the first embodiment, this variation in fluid transmission between the units will produce a resultant rotation in ring gear 102 which in turn causes output shaft 99 to rotate at a speed and in a direction determined by the position of handle 98.

The apparatus illustrated in FIGS. 13–16 represents a particular application of the features, and principles of operation, of the invention, which improves the acceleration and deceleration of a rotating member. The environment chosen to illustrate this embodiment is a road wheel 110 of an automobile or similar vehicle. As in conventional automobiles, the wheel is mounted on an axle 112 rotatably mounted in a roller bearing 111, and a hub 114 of the wheel is fixedly mounted on axle 112 by means of a nut 113. A key 115 extending from axle 112 insures that hub 114 will rotate along with axle 112. A wheel cover 116 is secured to hub 114 by means of bolts 118 and a hub cap 120 is releasably fit onto wheel cover 116. A rim 122 is carried by wheel cover 116, and accommodates a conventional tire 124. A cylindrical brake drum 126 extends integrally from hub 114 and serves, along with a conventional brake shoe 128, in a well-known manner to stop the rotation of road wheel 110. A non-rotatable cylindrical sleeve 130 is disposed around axle 112 and is secured to any non-rotatable portion of the vehicle, such as the chassis (not shown). Sleeve 130 has secured to it bearing 132.

A sun gear 134 is secured to hub 114 so that sun gear 134 rotates along with axle 112. The hub of sun gear 134 has secured to it a second bearing 136.

A rotatable casing 137 composed of individual sections 138, 140, and 142, is rotatably mounted on bearings 132 and 136, and is thus rotatable about the axis of rotation of road wheel 110. The casing sections are secured to one another by means of a plurality of studs 144 extending through each of the casing sections, and which are secured within bores 141 and 143 formed in sections 138 and 142, respectively, by means of nuts 146.

Casing section 140 is provided with a series of cutouts 148, equidistantly spaced apart around axle 112, which accommodate a series of planet gears 150 rotatably mounted on studs 144. The teeth of planet gears 150 engage the teeth of sun gear 134 to form the fixed displacement unit. Casing section 142 is also provided with a series of cutouts 152, which are offset from cutouts 148 in section 140, so that a cutout 152 is disposed between each pair of adjacent cutouts 148. Cutouts 152 accommodate a second group of planet gears 154 rotatably mounted on a second group of studs 144', the latter extending through casing 137. Studs 144' are spaced apart in casing 137 and a stud 144' is located between each adjacent pair of studs 144.

The teeth of planet gears 154 engage the teeth of a non-rotatable sun gear 156 which slidably engages a splined extension 158 of the sleeve 130. Since sleeve 130 is not free to rotate, sun gear 156 is consequently also non-rotatable. It should be mentioned, however, that if the wheel 110 is thought of as corresponding to the housing 10 of FIGS. 1–8, the sun gear 134 is the gear which is non-rotatable with respect to the housing, and the sun gear 156 is rotatable with respect to the housing.

Figure 13:
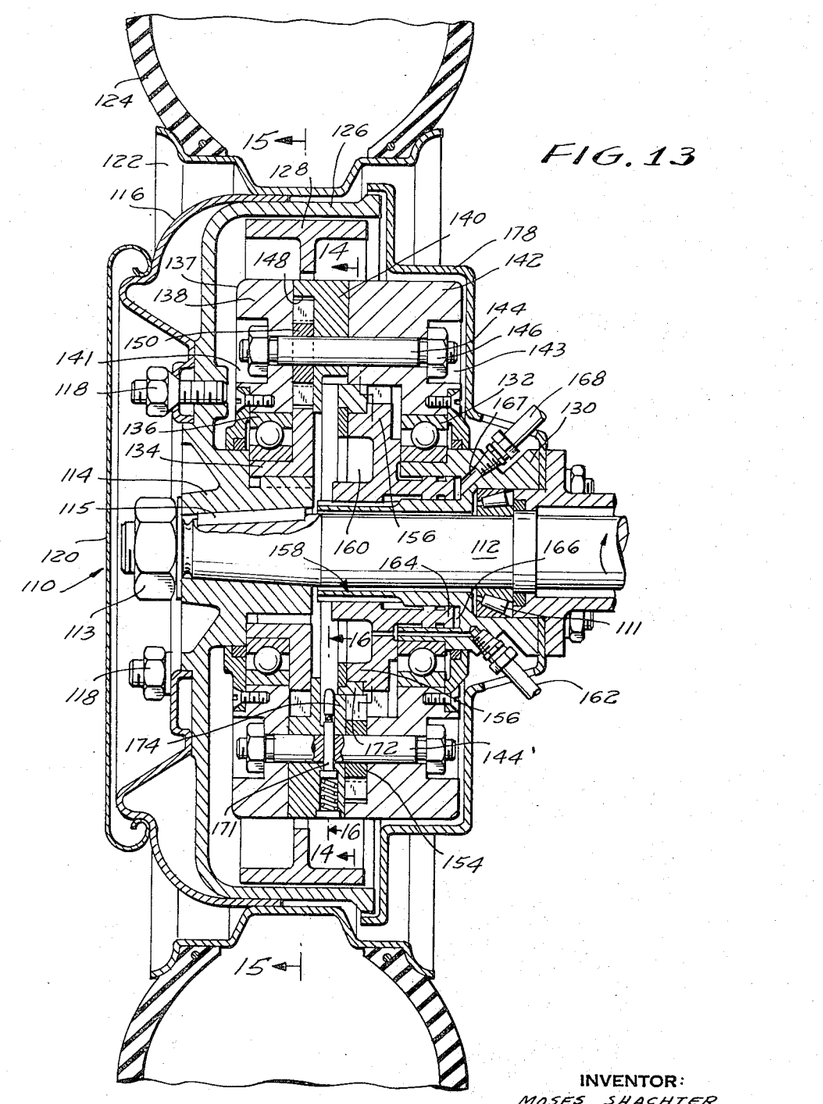
FIG. 13 is a vertical cross-sectional view of still another embodiment of the invention.
Figure 14:
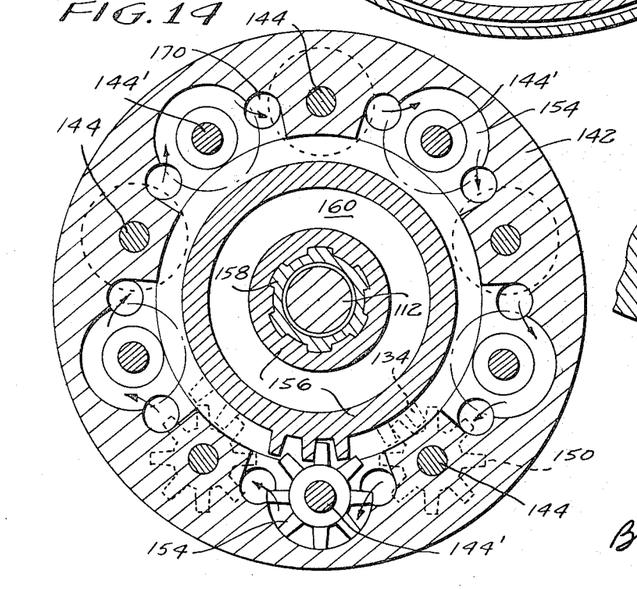
FIG. 14 is a section taken along line 14—14 of FIG. 13.
Figure 15:
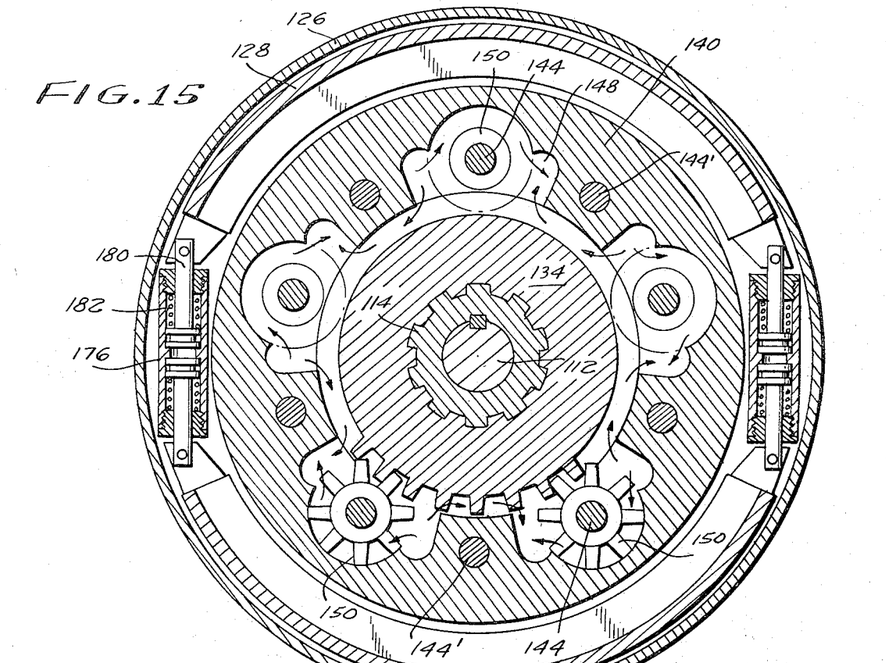
FIG. 15 is a section taken along line 15—15 of FIG. 13.

The planet gears 154 and the non-rotatable sun gear 156 form a variable displacement hydraulic unit, for reasons which will now be described. As seen in FIGS. 13 and 14, sun gear 156 extends into a central chamber 160 formed in casing 137 between sections 140 and 142. Fluid delivered from an external source under pressure into chamber 160 through pipe 162, tends to keep sun gear 156 to the right of chamber 160 (FIG. 13). Sun gear 156 is, however, provided with a tubular piston 164, which extends into a corresponding tubular chamber 166 formed in sleeve 130. A pipe 168 communicates with chamber 166 through an inclined passageway 167. Fluid introduced, under pressure, from an external source into chamber 166 is capable of urging sun gear 156 toward the left and thus varies the width of engagement between the teeth of sun gear 156 and the teeth of planet gears 154.

A plurality of conduits 170 extend through the casing 137 between the two hydraulic units, and transmit hydraulic fluid between the two units to provide a closed hydraulic circuit between the units.

Sealing of the variable displacement unit is provided by a rotatable sealing ring 172 slidably engaging a similarly formed ring 174 which is press fitted into casing section 140. Sealing rings 172 and 174 are shaped so that the form of the plane of intersection between them conforms to the curve formed by the ends of the teeth of the sun gear 156 where they do not engage the planet gears 154, and the ends of the teeth of the planet gears 154 where they engage the sun gear 156. It will therefore be appreciated that a leak tight, closed hydraulic circuit has been formed between the variable and the fixed hydraulic displacement units. Fluid flow between the units is through the fluid conduits 170 formed in the casing 137.

Figure 16:
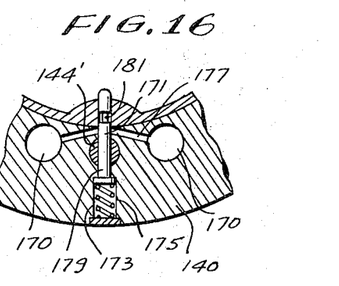
FIG. 16 is a fragmentary sectional view taken along line 16—16 of FIG. 13.

As seen in FIGS. 13 and 16, a by-pass valve 171 is mounted on a compression spring 173 disposed within a cavity 175 formed in casing section 140. One of the studs 144 has a vertical passageway formed in it to accommodate the valve 171 through it. Channels 177 are formed in casing section 140 and pass between each two adjacent conduits 170. A valve 171 is associated with each channel 177. In the normal position shown in FIG. 16, the shank section 179 of each valve 171 seals off its respective channel 177 and prevents fluid flow between the adjoining conduits. Thus, fluid can only flow through the conduits 170 to and fro between the two hydraulic units. Valve 171 is also provided with a reduced diameter neck 181. When by-pass valve 171 is urged downwards against springs 173, the neck 181 is positioned, by means described below, within channel 177 and permits fluid to flow between the adjoining conduits, thus effectively short-circuiting fluid flow through conduits 170 between the two hydraulic units.

In this embodiment, the sun gear 134 rotates along with the road wheel 110, and produces a rotation in the casing 137. The speed of rotation of the casing 137 will be a function of the engagement width of the sun gear 156 and the planet gears 154, and may be expressed by Equation 5 above, the symbols being defined as follows:

$\omega_0$=rotational speed of rotatable sun gear 134,
$\omega_1$=rotational speed of the casing 137,
$W_1$=variable width of engagement of sun gear 156, and
$W_2$=width of sun gear 134.

The main purpose of varying the rotational speed of the casing 137 by varying the width of engagement of the sun gear 156, is to utilize the rotating casing as a kinetic energy accumulator, during the braking of the road wheel 110, to help decelerate the vehicle. Conversely, when the braking force is released, the accumulated kinetic energy in the casing is transferred to the road wheel 110 to augment the acceleration of the road wheel. How this is achieved is described below with respect to a substantially conventional vehicle braking operation.

Two pairs of diametrically opposed conventional brake cylinders 176 accommodate pistons 180, which are urged by a pressurized brake fluid against springs 182 to urge the brake shoes 128 up against the brake drum 126, and thereby decelerate the wheel 110. Sun gear 134 rotates along with the road wheel 110. When sun gear 156 is in its rightmost position, the width of engagement $W_1$ is relatively small in comparison to the width $W_2$ of sun gear 134. From Equation 5, it is seen that in this condition the casing 137 will rotate at about the same speed as road wheel 110. When braking fluid is supplied to the brake cylinders 176, pressurized fluid is supplied to the tubular chamber 166 in cylinder 130 to urge sun gear 156 to the left side of chamber 160. Springs 182 are prestressed so that the pistons 180 and the springs 182, respectively, actuate and release the brake only when the sun gear 156 is in the extreme left position in chamber 160.

The movement of sun gear 156 towards the left of chamber 160 increases its engagement width and, therefore, increases the rotational speed of casing 137. This can be seen from Equation 5, and results from the same principles described in the discussion of the earlier embodiments. When sun gear 156 has been moved by the pressurized fluid to its extreme leftwards position in chamber 160, the pressure fluid in brake cylinders 176 overcomes the resistance of springs 182 and causes the braking mechanism to stop the rotation of the road wheel 110. However, at this point sealing ring 172, which has moved towards the left along with sun gear 156, pushes by-pass valve 171 downwardly thus effectively short-circuiting the fluid circuit through conduits 170. This action short circuits the fluid path between the two hydraulic units, so that the casing 137 is able to continue rotating at its increased rotational speed, corresponding to the increase in the engagement width $W_1$, even when the rotation of road wheel 110 has come to a halt.

When the braking action is released, the fluid pressure in both the brake cylinders 176 and in tubular chamber 166 is reduced. The springs 182 will release the brake and the fluid within chamber 160 will move sun gear 156 to the right thereby decreasing the engagement width $W_1$. Channel 177 is once again closed by the disengagement of ring 172 and by-pass valve 171. The closing of channel 177 reactivates the hydraulic circuit between the two hydraulic units, and causes the speed of casing 137 to decrease as a result of the decrease in the engagement width $W_1$.

The increase in the kinetic energy in the rotating casing 137, during the braking of the road wheel 110, removes energy from the road wheel 110 and thus augments the decelerating effect of the braking action. Furthermore when the braking is released, some of the kinetic energy in casing 137 is transferred back to the road wheel to augment the acceleration of the road wheel.

It will be appreciated that the energy accumulator described above may be utilized in any wheel of the vehicle and not only with a wheel directly connected to the engine. It will be further appreciated that the energy accumulator described above may be connected with any rotatable member to aid the member during acceleration and deceleration.

While the embodiment of the energy accumulator described utilizes two sun gears, a construction which comprises ring gears in one or both of the hydraulic displacement units is also within the scope of this invention. It will also be understood that both hydraulic displacement units may be of the variable displacement type.

While the invention has been described with respect to specific embodiments thereof, it will be understood that modifications may be made thereto without departing from the spirit and scope of the invention as defined in the appended claims.

What is claimed is:

1. An infinitely variable hydraulic transmission system comprising:
    a housing,
    a casing rotatably supported within said housing,
    a first hydraulic unit on one side of said casing, said unit including a principal gear rotatably mounted within said housing, and a series of planet gears engaging the periphery of said rotatable gear,
    a second hydraulic unit on the other side of said casing, said second unit including a principal gear non-rotatable with respect to said housing, and a series of planet gears engaging the periphery of said non-rotatable gear,
    a plurality of conduits in said casing for conducting fluid between said first and second units, and
    means for varying the fluid receiving and discharging capacity of at least one of said hydraulic units.

2. A transmission system as defined in claim 1 including an input shaft secured to said casing, said input shaft serving to transmit rotary motion to said casing, and an output shaft secured to the principal gear of one of said hydraulic units, said output shaft being rotatable in response to the flow of fluid between said hydraulic units, variation in the fluid receiving and discharging capacity of one of said units causing variation in the relative speeds of rotation of said shafts.

3. A transmission system as defined in claim 1 wherein the planet gears of each of said hydraulic units are rotatably mounted on said casing.

4. A transmission system as defined in claim 1 wherein the axes of rotation of said casing and rotatable gear, and the longitudinal axis of said non-rotatable gear are all colinear.

5. A transmission system as defined in claim 1 wherein said rotatable gear is a sun gear, and said non-rotatable gear is a ring gear.

6. A transmission system as defined in claim 1 wherein said rotatable and non-rotatable gears are both ring gears.

7. A transmission system as defined in claim 1 wherein said rotatable and non-rotatable gears are both sun gears.

8. A transmission system as defined in claim 1 wherein said varying means comprises means for varying the width of engagement between said principal gear and the planet gears of at least one of said hydraulic units.

9. A transmission system as defined in claim 1 wherein said housing is a rotatable element capable of being driven by an external power source, the relative speed of rotation between said housing and casing varying with the variation in receiving and discharging capacity of said one hydraulic unit, whereby as said capacity is increased the speed of said casing increases with respect to the speed of said housing so that said housing is decelerated, and as said capacity is increased the speed of said casing decreases with respect to the speed of said housing so that said housing is accelerated.

10. A transmission system as defined in claim 9 including means for selectively permitting fluid flow between said conduits while by-passing said hydraulic units, thereby permitting said casing to continue rotating even when said housing has been brought to a stop.

No references cited.

EDGAR W. GEOGHEGAN, *Primary Examiner.*